Nov. 20, 1962 A. W. SERIO 3,065,016
DETACHABLE HANDLE APPARATUS
Filed Dec. 24, 1958 2 Sheets-Sheet 1
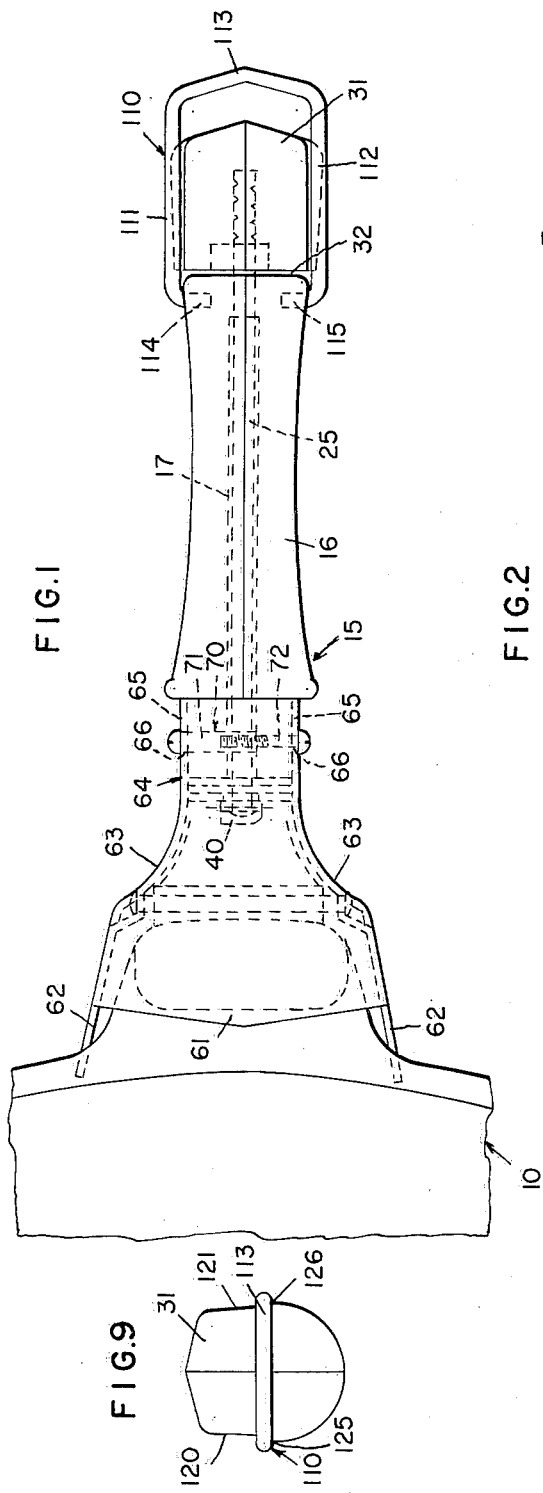
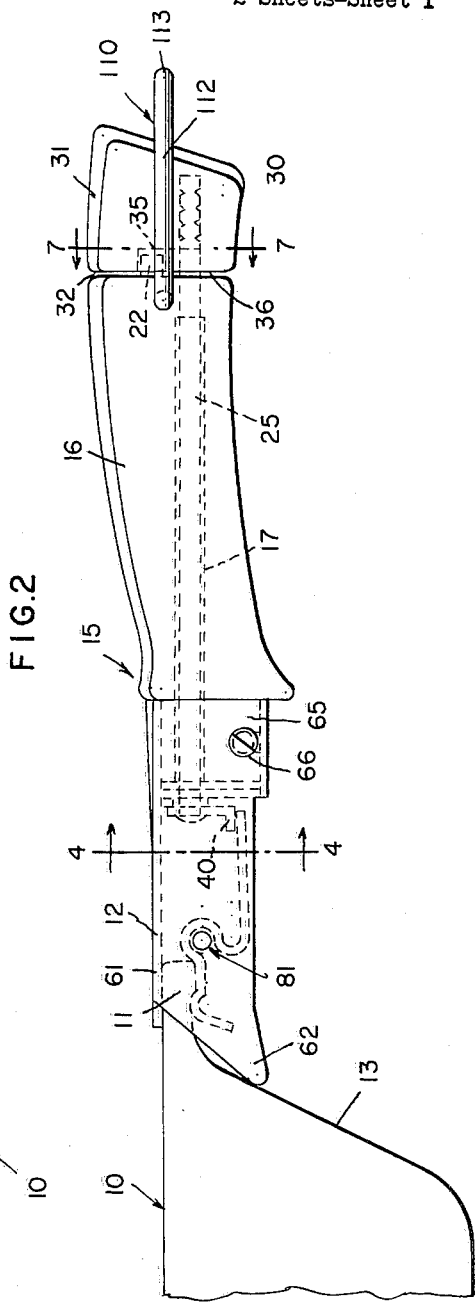
INVENTOR.
Anthony W. Serio
BY
Shoemaker & Mattare
ATTYS.

Nov. 20, 1962
A. W. SERIO
3,065,016
DETACHABLE HANDLE APPARATUS
Filed Dec. 24, 1958
2 Sheets-Sheet 2
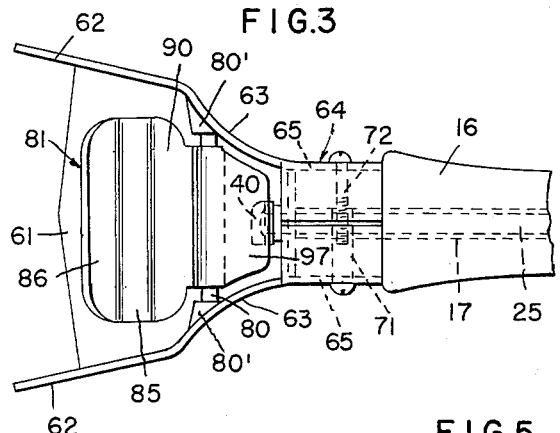
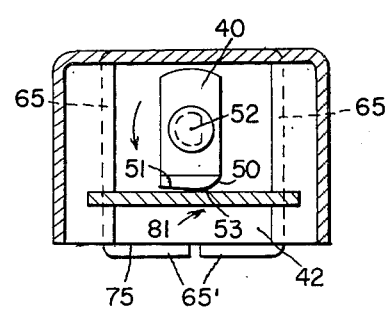
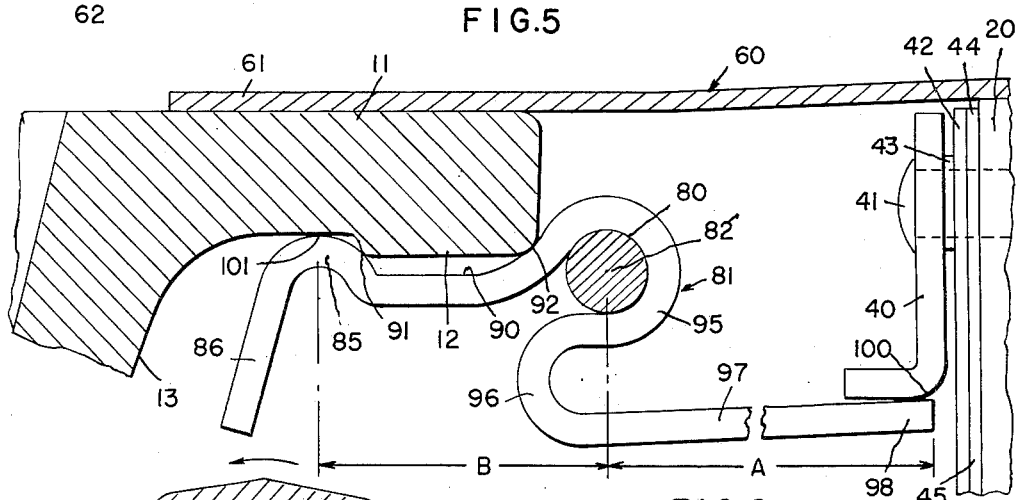
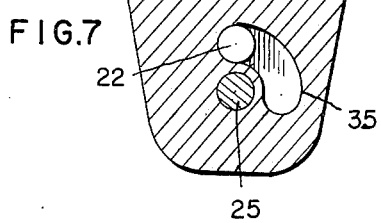
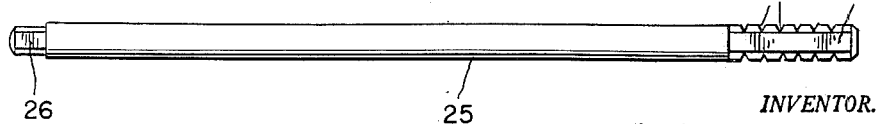
INVENTOR.
Anthony W. Serio
BY
Shoemaker & Mattare
ATTYS.

United States Patent Office 3,065,016
Patented Nov. 20, 1962

3,065,016
DETACHABLE HANDLE APPARATUS
Anthony W. Serio, 1704 Caton Ave., Elmira, N.Y.
Filed Dec. 24, 1958, Ser. No. 782,750
9 Claims. (Cl. 294—31)

The present invention relates to a detachable handle apparatus, and more particularly to a detachable handle apparatus which is adapted to be quickly attached to articles such as casserole dishes and the like. The present invention comprises an improvement over U.S. Patent No. 2,851,299.

When using casserole dishes or the like, the dish often becomes very hot as a result of cooking foods in an oven or the like and it is desirable to provide means for lifting the dish from place to place without the necessity of handling it with bulky, heat insulating pads and the like. It is accordingly a primary object of the present invention to provide a detachable handle which can be quickly and easily attached to and removed from such a dish for lifting and handling the dish without the necessity of actually touching the dish and further providing a heat insulating means which prevents discomfort to the hands of the user.

It is additionally important to provide a detachable handle mechanism which when mounted in position on a dish presents a neat and pleasant appearance, and which provides a construction which is relatively compact and light in weight. The above objectives are accomplished in the present invention by providing a detachable handle apparatus which cooperates with a casserole dish or the like having integral extensions formed thereon and provided with a lip with which the handle apparatus is adapted to cooperate.

In the construction according to the present invention, the detachable handle apparatus includes a hand grip member which is normally held in the hand, and a gripping assembly supported at the inner end of the hand grip member. The gripping assembly includes a foot-like portion having a pair of spaced leg elements extending downwardly therefrom for straddling the extension provided on the dish and for engaging the side wall of the dish. The undersurface of the foot-like member is adapted to engage the upper surface of the extension on the dish, and a clamping element pivotally mounted by the gripping mechanism is adapted to engage the undersurface of the extension on the dish for clamping the gripping mechanism to the extension of the dish.

An actuating means includes an elongated rod extending through the hand grip member and having a cam element on the end thereof for engaging the clamping element to urge it into clamping position. The opposite end of the rod is connected to an extension element which is rotatable with respect to the hand grip member for operating the cam element.

The clamping element according to the present invention is an important feature since the construction thereof provides important advantages over structure previously employed in the art. The clamping element includes an arcuate support end portion for engaging the supported article, and a trough-like portion is defined closely adjacent the support end portion for receiving a lip formed on the supported article. The intermediate portion of the clamping element is of substantially horse-shoe configuration and is wrapped partially around a pivot pin such that the clamping element is freely pivotally mounted upon the pin, and yet can not be removed from the pivot pin.

The opposite or locking end portion of the clamping element is adapted to engage the cam element or locking cam of the actuating mechanism for locking the apparatus in clamping position. The distance from the area of contact between the locking end portion of the clamping element and the locking cam to the pivot axis of the pivot pin is substantially greater than the distance from the area of contact between the support end portion of the clamping element and the supported article and the pivot axis of the pivot pin such that the force exerted by the locking cam has a greater lever arm than the force exerted by the supported article. This particular structural arrangement in combination with the fact that the clamping element is an integral resilient member having an intermediate portion wrapped around a pivot pin provides a novel coaction such that the greater the weight of the supported article, the greater the clamping force exerted by the clamping element upon the extension on the dish or the like such that the article is firmly clamped in position regardless of the amount of weight of the supported article.

The above-described novel clamping action is very important since it has been found that prior art structures such as shown in Patent No. 2,851,299 have a tendency to allow the supported article to slip out of the handle structure when relatively large loads are applied to the structure. Whereas, prior art structures of this type have been found to undesirably release the supported articles when the weight exceeded approximately 20 pounds, the present structure has been found to efficiently clamp a supported article such as a casserole dish in clamped position when the article exceeds a weight of 30 lbs. It is apparent that this represents a very substantial increase in the effectiveness of the handle apparatus.

The structure according to the present invention also is designed such that no prestressing of the clamping element is required to obtain effective clamping of the supported article. While the clamping effect of the present apparatus is enhanced as the load increases, it is desirable to provide an arrangement such that the detachable handle apparatus will not release when the article is under relatively small loads. In order to insure that the clamping mechanism does not release a novel locking detent means is provided for preventing such action. The locking detent mechanism comprises a yoke-like member which incidentally may also be used as a hook for hanging up the handle, this yoke-like member including a pair of opposite end portions which are pivotally secured to the hand grip member of the apparatus. The side legs of this detent mechanism are adapted to engage the side walls of the extension element connected with the actuating mechanism. These side walls are tapered outwardly from the top toward the bottom portion of the extension element such that the side legs of the detent mechanism snugly engage the side walls, a laterally projecting shoulder being formed at the lower portion of each of the side walls for positively limiting movement of the detent mechanism in one direction. When the detent mechanism is disposed such that it is straddling the extension element and is in engagement with the side walls thereof, the extension element is prevented from rotating with respect to the hand grip member, and accordingly the clamping element is maintained in proper clamping position and there is no possibility of the supported article being accidentally released.

An object of the present invention is to provide a new and novel detachable handle apparatus which is particularly adapted for use with casserole dishes and the like.

Another object is to provide a detachable handle apparatus which has a very attractive appearance, and can be quickly and easily attached to or removed from a dish or the like.

A further object of the invention is to provide a detachable handle apparatus including means for positively preventing release of the clamping element when the device is under relatively little load Yet another object of the invention is to provide a detachable handle apparatus which is especially adapted to support heavy loads and wherein the clamping effect is enhanced as the load increases.

A still further object of the present invention is the provision of a detachable handle apparatus which is quite simple, compact, and inexpensive in construction, and yet which is sturdy and reliable in operation.

Other objects and many attendant advantages of the present invention will become more apparent when considered in connection with the specification and accompanying drawings, wherein:

FIG. 1 is a top view of the handle apparatus in clamping position upon an extension of a casserole dish or the like;

FIG. 2 is a side view of the assembly shown in FIG. 1;

FIG. 3 is a bottom view of the assembly shown in FIG. 2;

FIG. 4 is a secttional view taken along line 4—4 in FIG. 2 looking in the direction of the arrows;

FIG. 5 is an enlarged view illustrating the construction of the clamping element according to the present invention;

FIG. 6 illustrates the hand grip member according to the present invention;

FIG. 7 is an enlarged sectional view taken along line 7—7 of FIG. 2 looking in the direction of the arrows;

FIG. 8 is an enlarged view illustrating the actuating rod of the device; and

FIG. 9 is an end view of the extension element and associated locking detent mechanism.

Referring now to the drawings wherein like reference characters designate corresponding parts throughout the several views, a casserole dish or the like is indicated generally by reference numeral 10 and includes an integral extension 11 having a downwardly projecting lip portion 12 on either surface thereof. The dish is also provided with a downwardly sloping outer wall 13. The detachable handle apparatus according to the present invention is illustrated generally by reference numeral 15, and includes a hand grip member 16 which is seen most clearly in FIG. 6. The hand grip member has a longitudinal bore 17 extending therethrough, the end portion 18 of the bore being of reduced diameter. The end portion 20 of the hand grip member is of reduced size and is provided with a substantially U-shaped channel 21 formed through the lower portion thereof. An integral stop element 22 is formed on the opposite end face 23 of the hand grip member. An actuating rod 25 as seen most clearly in FIG. 8 is provided with a first end portion 26 of reduced diameter, and the opposite end portion 27 thereof is provided with a plurality of grooves 28. Actuating rod 25 is mounted within the longitudinal bore in the hand grip member seen in FIGS. 1 and 2, the actuating rod being spaced from the walls of the bore portion 17, and being supported within the bore portion 18 of the hand grip member. This arrangement reduces the conduction of heat through the actuating rod to a minimum. End portion 27 of the actuating rod is mounted within a bore 30 in an extension element 31, the grooves being adapted to receive an adhesive substance for securely attaching the extension element to the actuating rod. Extension element 31 is spaced a small distance from the hand grip member, this space being indicated by reference numeral 32, and an arcuate groove 35 is provided in the end face 36 of the extension element, groove 35 extending through an arc of approximately 90 degrees and receiving member 22 formed integral with the hand grip member. It is evident that the groove 35 and element 22 cooperate to limit movement of the extension element with respect to the grip member, and the extension element can rotate through an angle of approximately 90 degrees with respect to the hand grip element. It is evident that rotation of the extension element will produce a corresponding rotation of the actuating rod having a cam element 40 mounted at the outer end thereof and retained in position by a head 41 formed on the end of the actuating rod. A plate member 42 having a shoulder 43 formed thereon for engaging the cam element 40 is mounted upon actuating rod 41 to assist in supporting the actuating rod as hereinafter described, and a sheet 44 of insulating material is disposed between plate 42 and the end surface 45 of portion 20 of the hand grip member for reducing the conduction of heat to the hand grip member.

As seen most clearly in FIG. 4, cam element 40 is provided with a rounded lower surface 50 which merges into a flat surface 51. Surface 50 is formed as an arc having a radius at the axis of rotation 52 of the actuating rod, and surface 51 is slightly offset from a line tangent to arc 50 for a purpose hereinafter described. The gripping mechanism includes an integral body 60 defining a central foot-like portion 61, the lower surface of which is adapted to engage the upper surface of the extension on a dish or the like and a pair of downwardly and outwardly flaring leg portions 62 extend therefrom as seen most clearly in FIGS. 1 and 3. These leg portions 62 are adapted to straddle the extension on the supported article, and engage the side wall 13 of the dish as seen for example in FIG. 2. The rear portion of body 60 includes inwardly tapering side walls 63 which narrow to a neck portion 64 as seen in FIG. 1, the side walls 65 of the neck portion 64 being provided with aligned openings 66 which are adapted to be aligned with the channel 21 in portion 20 of the hand grip member. An attaching means indicated generally by reference numeral 70 includes a hollow cylindrical member 71 having threads formed on the inner bore thereof, and a screw member 72 which is threadedly received within member 71. It is apparent that attaching means 70 serves to secure the gripping mechanism to the hand grip member and positively prevents separation thereof. The side walls 65 of the gripping mechanism are disposed closely adjacent the side walls of portion 20 of the hand grip member, and the lower portions of side walls 65 are turned inwardly at 65' as shown most clearly in FIG. 4 and are adapted to engage the under surface 75 of extension 20 for more securely mounting the gripping mechanism in place.

Plate 42 mounted on the actuating rod adjacent cam 40 is provided with a configuration complementary to that of the inner surface of neck portion 65 of the gripping mechanism whereby the plate is supported by the gripping mechanism and serves as an additional support for the actuating rod 25.

A pivot pin 80 is supported within portions 80' formed at opposite sides of the body means 60, and a clamping element indicated generally by reference numeral 81 is supported upon pivot pin 80, the pivot pin having a pivot axis represented by reference numeral 82. As seen most clearly in FIG. 5, clamping element 81 comprises an integral member formed of resilient material such as spring steel or the like, and is provided with an arcuate support end portion 85 adapted to engage the under surface of extension 11 of the dish or the like. The end 86 of the clamping element extends in a downward direction.

Closely adjacent support end portion 85, the clamping element defines a trough-like portion indicated by reference numeral 90, this trough-like portion being adapted to receive lip 12 of the dish and supporting this lip at points indicated by reference numerals 91 and 92. The intermediate portion 95 of the clamping element is of substantially horse-shoe-shaped configuration and is wrapped partially around pivot pin 80 such that the clamping element is free to pivot about pin 80, and yet can not be removed therefrom when the device is assembled as shown. The clamping element is reversely turned at 96 and extends rearwardly in a relatively straight portion 97 which terminates in a locking end portion 98 adapted to engage the locking cam 40. It is apparent that rotation of the locking cam will cause the clamping element to be urged into engagement with the extension on the dish for clamping the dish in operative position.

Locking end portion 98 of the clamping element engages the locking cam at an area indicated by reference numeral 100, and the distance from this area of contact to the pivot axis 82 of the pivot pin is indicated by the arrows marked "A," and this represents a lever arm about which any reaction forces produced by the locking cam will operate. The support end portion 85 of the clamping element engages the extension of the dish at an area indicated by reference numeral 101, and the distance from this area of contact to the pivot axis 82 of the pivot pin is indicated by arrows marked "B," and this represents the lever arm about which any forces produced by the weight of the supported article will operate.

An important feature of the present invention is the fact that the distance indicated by arrows "A" is substantially greater than the distance indicated by arrows "B" and according to the present embodiment, the distance indicated by arrows "A" is substantially two and one half times as great as the distance indicated by arrows "B." This interrelationship is important since any forces acting downwardly along area 101 will be transmitted through the pivotally mounted clamping element and produce a reaction force at area 100. These reaction forces developed at the point of contact between the locking end portion of the clamping element and the locking cam will operate through a larger lever arm than the forces produced by the weight of the article at point 101, and due to the construction and mounting of the clamping element about the pivot pin 80 will cause an enhanced clamping effect upon the article such that if the weight of the article increases, the clamping element will clamp the article tighter within the clamping mechanism. In this manner, the apparatus is adapted to support relatively heavy loads, and there is no tendency of the clamping element to slip with respect to the supported article as the article becomes loaded.

Referring again to FIG. 4 of the drawings, the locking cam is illustrated in locking position, and has been rotated as indicated by the arrow into this position. The point of contact 53 between the cam and the upper surface of the clamping element is just beyond the arcuate surface 50 of the cam such that the cam is in effect in an over center position such that it is locked with respect to the clamping element, and will not release until the cam is rotated with respect to the clamping element.

In order to insure that the device will not accidentally release, a locking detent means indicated generally by reference numeral 110 is provided as seen most clearly in FIGS. 1, 2 and 9. This locking detent means comprises an integral member having opposite legs 111 and 112 connected by an intermediate portion 113, the outer free ends 114 and 115 of the detent means being seated within cooperating openings formed in the sides of the hand grip member whereby the detent means is pivotally supported by the hand grip member. The leg portions 111 and 112 of the detent mechanism are adapted to engage the side walls 120 and 121 of the extension element 31, the side walls 120 and 121 tapering outwardly in a downward direction as seen most clearly in FIG. 9. This tapering of the side walls is such that when the detent mechanism is pivoted into locking position as shown in the drawings, the side walls will be engaged within opposite legs of the detent mechanism which is preferably formed of resilient material. A pair of shoulers 125 and 126 are formed integrally with the extension element and extend laterally thereof at the lower portions of side walls 120 and 121 respectively. These shoulders serve to positively limit the movement of the detent mechanism in one direction with respect to extension element 31. It is apparent that the yoke-like extension member 110 when disposed in locking position as shown positively prevents rotation of the extension element with respect to the hand grip member thereby insuring that the clamping mechanism does not accidentally release. Of course, when it is desired to attach or release the handle apparatus to a dish or the like, a simple rotary movement of extension element 31 through an arc of approximately 90 degrees serves to effectively attach or release the handle to a dish.

It is apparent from the foregoing that there is provided a new and novel detachable handle apparatus which is especially adapted for use with casserole dishes and the like having an extension thereon for receiving a handle apparatus. The invention device provides an attractive appearance and may be quickly and easily attached or removed from a dish or the like. The detachable handle apparatus of the invention is especially suited for supporting heavy loads without the danger of the article being accidentally released. While the device may be so designed that actuation of the cam element produces a certain amount of prestressing of the clamping element, no such prestressing is necessary, and the locking detent mechanism insures that the clamping mechanism will not release even when under little or no load. The device is quite simple, compact and inexpensive in construction, and it is quite sturdy and reliable in operation.

As this invention may be embodied in several forms without departing from the spirit or essential characteristics thereof, the present embodiment is therefore illustrative and no restrictive, and since the scope of the invention is defined by the appended claims, all changes that fall within the metes and bounds of the claims or that form their functional as well as conjointly cooperative equivalents are therefore intended to be embraced by those claims.

I claim:
1. A detachable handle for cooking saucepans and like vessels, comprising an elongate handle body, a locking mechanism supported by said handle body and including a locking cam and a clamping element for clamping an article between said clamping element and a portion of said handle body, a pivot pin supported by said handle body, said clamping element comprising an integral elongate member including a forward support end portion for engaging a supported article, an intermediate portion and a rear end locking portion for engaging said locking cam, the said intermediate portion of said clamping element including a part curving over and in snug engagement with more than half the circumference of said pivot pin for pivotally supporting the clamping element on said pivot pin, means for actuating said locking cam against said rear end locking portion to effect a clamping engagement of said support end portion with a portion of the vessel interposed between the support end portion and a part of the handle body, and said pivot pin encircling part being adapted to firmly grip the pivot pin upon an increased application of force upon said support end portion.

2. A detachable handle for cooking saucepans and like vessels, comprising elongate hand grip member, actuating mechanism supported by said hand grip member and including a separate hand grip extension element supported at the outer end of said hand grip member for rotation about an axis extending longitudinally of the hand grip member, said actuating mechanism also including a cam means supported adjacent the opposite end of said hand grip member and operatively connected with said extension element, a gripping assembly supported at said opposite end of the hand grip member and including a pivoted clamping element for selective engagement with a lip on a supported vessel, said cam operatively engaging said clamping element for actuating the clamping element into operative position upon rotation of said extension element with respect to said hand grip member, and a locking detent means comprising a yoke-like member pivoted to said hand grip member and having an intermediate portion adapted to be disposed in spanning relationship to said extension element for engaging opposite lateral walls thereof and preventing relative rotation between said hand grip member and said extension element.

3. Apparatus as defined in claim 2, wherein the said lateral walls of said extension element taper outwardly from the top portion of the element toward the bottom portion of said element, the lower portions of said tapered surfaces being adapted to engage said locking detent means and being tightly received within portions of said locking detent means for maintaining the locking detent means in position thus preventing accidental disengagement of the detent means by a hand engaged over the hand grip member and selectively preventing rotation of the extension element with respect to the hand grip member.

4. Apparatus as defined in claim 3, wherein said extension element includes laterally projecting shoulder portions positioned at the lower portions of said tapered wall of the extenion element for supporting the locking detent means limiting movement thereof in one direction.

5. A detachable handle for cooking saucepans and like vessels, comprising an elongate hand grip member, an actuating rod extending through said hand grip member and projecting beyond the opposite ends of said hand grip member, a separate hand grip extension element secured to one end of said actuating rod, a cam element secured to the opposite end of said actuating rod, a gripping assembly fixed to said opposite end of the hand grip member and including a transversely extending pivot pin, a clamping element formed of an elongate unitary member of resilient material and of substantial width, said clamping element including a forward support end portion for engaging a supported article, said clamping element also including an intermediate portion and a locking end portion for engaging the cam element, said intermediate portion of the clamping element being formed to provide a channel extending across the width of said member and encircling substantially more than half the circumference of and bearing upon said pivot pin whereby said clamping element is pivotally mounted on and snugly engages around the major part of the pivot pin and the channel extending substantially the full length of the pivot pin, the distance from the point of contact between said locking end portion of the clamping element and the cam element to the pivot axis of the pivot pin being substantially greater than the distance from the point of contact of said support end portion of the clamping element and a supported article to the pivot axis of the pivot pin.

6. Apparatus as defined in claim 5, including a locking detent member pivotally supported by said hand grip member and having a pair of leg portions disposed adjacent the side walls of said extension element, said side walls of the extension element tapering downwardly from the upper portion of the extension element to the lower portion thereof, the lower portions of said tapered side walls being spaced apart a sufficient distance so as to be snugly received between the legs of said detent locking means for securing the detent locking means in operative position so as to prevent rotation of said extension element with respect to said hand grip member.

7. Apparatus as defined in claim 6, wherein said extension element includes a shoulder disposed adajcent the lower portion of each of said tapered side walls for supporting the legs of said locking detent means and limiting movement thereof in one direction.

8. A detachable handle for cooking saucepans and like vessels, comprising an elongate handle body including a hand grip portion and a forward end portion, said forward end portion embodying a stationary top part and transversely spaced side walls, locking means movably supported by said handle body and including a locking cam, a pivot pin extending transversely across, between and supported at its ends by said side walls, an elongate clamping element of substantial width and including a forward supporting end portion for engaging a supported article, an intermediate portion and a locking rear end portion for engaging said locking cam for locking the clamping element in operative position, said intermediate portion being formed to define a transversely extending channel for receiving said pivot pin, said channel opening downwardly with respect to said stationary top part of the handle body and snugly engaging the pivot pin around more than half the circumference of the pivot pin and pivotally supporting the clamping element on the pivot pin, said channel engaging the pivot pin through substantially the full length of the pin, means for actuating the locking cam against said rear end locking portion to effect movement of the support end portion toward said stationary top part for clamping engagement of the support end portion with a flange of the vessel interposed between the support end portion and said stationary top part of the handle body and said pivot pin engaging channel being adapted to close to firmly grip the pivot pin upon an increased application of force upon said forward support end portion.

9. Apparatus as defined in claim 8, wherein said clamping element comprises an integral member, and the distance from the area of contact between said locking end portion and the locking cam to the pivot axis of the pivot pin is substantially greater than the distance from the area of contact between the support end portion of the clamping element and a supported article to the pivot axis of the pivot pin.

References Cited in the file of this patent
UNITED STATES PATENTS

| | | |
|---|---|---|
| 540,548 | High | June 4, 1895 |
| 627,668 | Holt | June 27, 1899 |
| 899,992 | Kessler | Sept. 29, 1908 |
| 1,366,638 | Demers | Jan. 25, 1921 |
| 2,201,727 | Henry | May 21, 1940 |
| 2,624,066 | Fry | Jan. 6, 1953 |
| 2,851,299 | Serio | Sept. 9, 1958 |